United States Patent [19]

Matuschek et al.

[11] Patent Number: 5,015,815
[45] Date of Patent: May 14, 1991

[54] PROCESS AND DEVICE FOR REGULATION OF RESISTANCE OR ARC WELDING PROCESSES

[76] Inventors: Ulrich Matuschek, Sperberweg 8; Martin Zimmermann, Mauerstrasse 94, both of D-5100 Aachen, Fed. Rep. of Germany

[21] Appl. No.: 294,607

[22] PCT Filed: Mar. 31, 1988

[86] PCT No.: PCT/EP88/00280
§ 371 Date: Nov. 30, 1988
§ 102(e) Date: Nov. 30, 1988

[87] PCT Pub. No.: WO88/07430
PCT Pub. Date: Oct. 6, 1988

[30] Foreign Application Priority Data

Mar. 31, 1987 [DE] Fed. Rep. of Germany ....... 3710727

[51] Int. Cl.⁵ ............................................. B23K 11/24
[52] U.S. Cl. ................................. 219/110; 219/117.1; 219/130.21
[58] Field of Search .................... 219/110, 109, 130.21

[56] References Cited

U.S. PATENT DOCUMENTS

| 4,302,653 | 11/1981 | Denning et al. | 219/110 |
| 4,403,132 | 9/1983 | Sugimoto | 219/110 |
| 4,419,560 | 12/1983 | Zurek | 219/110 |

Primary Examiner—Clifford C. Shaw
Attorney, Agent, or Firm—Michael J. Striker

[57] ABSTRACT

A welding operation is regulated by determining quantitatively (numerically) and with high resolution from the measured values the effect of a welding influencing parameter power

| or/and | energy |
| or/and | charge amount |
| or/and | electrode voltage |
| or/and | current strength | on the resistance. Current strength of a welding current and voltage at welding electrodes and measured and the resistance of a workpiece to be welded during the welding operation is determined and stored. The resistance is evaluated by comparing it with an empirically determined correcting or command variable.

7 Claims, 3 Drawing Sheets

PROCESS AND DEVICE FOR REGULATION OF RESISTANCE OR ARC WELDING PROCESSES

BACKGROUND OF THE INVENTION

The invention proceeds from a process for regulation of resistance welding operations in which by measuring the current strength of the welding current and the voltage at the welding electrodes, the dynamic resistance or resistance index of the workpiece to be welded is determined during the welding operation, stored and evaluated in comparison with an empirically determined correcting or command variable.

In process and apparatuses with measurement of the dynamic resistance during the welding operation, the resistance of the workpiece is repeatedly determined and related to the quality of the joint to be expected. Due to the low measuring technology expenditure, only physical quantities (voltage and current) being measured, which drop in spot welding, this process is preferably used for spot welding control. In all other known control methods of this type particularly distinguished quantities are determined in a respective half or whole welding period, for example the resistance at the instant of the current maximum or a resistance-similar quantity which results from the quotient of the integrated voltage with respect to the integrated current (MIACHY method). The variation of these distinguished quantities is determined over the entire welding time and when a switch-off criterion is reached the welding is terminated. The switch-off criteria are determined empirically.

These known processes use for the regulation the welding time or the number of welding periods per welding spot as the controlling variable. The energy introduced into the weld spot, which can be varied by the phase angle of the primary voltage, can be employed as additional controlling variable. DE-OS No. 3,301,039 discloses a process in the work integral introduced at the welding point is determined and within each mains half period the energy supply to the welding point is switched off after reaching a work integral corresponding to a desired value for the respective mains half period. To control the electrical work, thyristors which can be switched off are preferably employed.

In the known process due to inadequate information density or information evaluation, an advance recognition of a disturbance in the welding process is not possible.

SUMMARY OF THE INVENTION

In the process according to the invention, the variation of current strength and electrode voltage of a welding current half period is measured with high resolution, stored error-corrected and by mathematical processing, the effect of the welding influencing parameter power

|       |                  |
|-------|------------------|
| or/and | energy          |
| or/and | charge amount   |
| or/and | electrode voltage |
| or/and | current strength | on the dynamic resistance is determined quantitatively (numerically) and with high resolution (e.g. measuring point interval 10 microsec.) and is evaluated on-line comparison with the corresponding correcting or command variable. Preferably, the effects of several welding influencing parameters are determined quantitatively and employed individually or in combination with each other and compared with empirically determined basic values of the correcting and command variable.

In the process according to the invention the assessment of the quality of the weld spots is made immediately during a welding half period or cycle, i.e. on-line. Since the quantitatively acquired effects of the welding influencing variables are collected as correcting or command variables in high density or resolution and investigated for their characteristics, each welding operation can be controlled in such a manner that any impending disturbance is avoided.

The occurrence of disturbances, such as spattering, is indicated by characteristic basic values of the evaluated measured quantities which are compared with the stored correcting or command variables early enough to avoid the disturbance by changing the current strength or voltage or by changing the phase angles and thus changing the power supply, and the welding operation is terminated in optimum manner.

The apparatus necessary for carrying out this process consists of a measured value pickup, an evaluating unit and an adjusting unit. The measured value pickup detects by means of a current sensor, e.g. a Rogowski belt, and a voltage sensor the welding current and the voltage drop occurring across the workpiece, measured at the welding electrodes, digitizes the measured values and stores them. The measured value pickup must be fast enough to be able to record the time variation of the measured quantities during a welding half period with sufficient accuracy.

In the evaluating unit the stored measured values of a welding half period are evaluated on-line by means of a highspeed signal processor. The exact time profile of the welding current and electrode voltage is evaluated during a welding half period for its information content.

The evaluation rule is based on the following mathematical-physical model.

The starting point is the assumption of a functional dependence of the welding piece resistance during a welding half period on other quantities likewise derivable from current and voltage, for example power and energy. This assumption implicitly permits a possible feedback of resistance to the influencing variables. The electrical power P introduced into the welding process then takes on the function of representing the instantaneous dependences of the resistance on the electrical quantities. The purpose of the electrical energy E introduced into the welding process is to combine preferably time-delayed dependences and take account of the electrical and thermal history of the welding process or the weld spot. External influences such as the electrode movement, caused by poor fits or sinking of the electrodes into the workpiece, are described by the explicit time function $$R(t) = R(p(t), E(t), t, \ldots) \tag{1}$$

This equation contains a description of the resistance dependence from heuristic considerations and not a selfcontained analytically describable model concept.

From this equation power, energy and time parameters are determined as follows:

Since the functional dependence of the resistance is not known, the function is expanded in a series about the zero points of the time.

$$R(t) = Rp*(P(t) - P(0)) + Re*(E(t) - E(0)) + Rt*(t) + Rpet, \quad (2)$$
$$= Rp*P(t) + Re*E(t) + Rt*t + Ro$$

Rp, RE, Rt being partial derivatives with respect to P, E, t at the point P(0), E(0), t=0.

The series expansion is carried out up to terms of the first order and the partial derivatives Rp, Re, Rt represent to this approximation the measure of the influences of power, energy and time on the resistance. This data set is determined for each welding half wave at least once. On multiple determination the evaluation of each data set relates to a correspondingly small time interval within the welding half period. By means of these data sets the control is carried out in accordance with basic values of the control coefficients still to be determined, this being done by changing the phase angle of the primary voltage.

It has been found that on exceeding predetermined basic values for the coefficients, splattering occurred in the respective following welding half wave. This sensitivity of the coefficients is employed to control the welding operations, in particular the spot welding.

Hereinafter the mathematical manipulations of the measured values necessary for determining the power, energy and time coefficients are set forth.

Within an evaluation period the variation or resistance and influencing variables can be represented by polynoms whose coefficients can be determined from the measured value fields by means of a suitable method (e.g. means square approximation).

Representing the resistance as a function of time by a polynom of the 3rd degree, then due to the dependence, considered linear, the influencing variables thereof are likewise to be represented as a function of time by polynoms of at the most the 3rd degree.

Assuming $E0, E1, E2, E3$ are the coefficients of the energy polynom
$P0, P1, P2, (P3)$ the coefficients of the power polynom
$R0, R1, R2, R3$ the coefficients of the resistance polynom $$E(t) = E0 + E1*t + E2*t^2 + E3*t^3 \quad (3)$$
$$P(t) = P0 + P1*t + P2*t^2 + P3*t^3$$
$$R(t) = R0 + R1*t + R2*t^2 + R3*t^3$$

then (2) gives by inserting (3) an equation system for determining energy, power and time coefficients and the constant term Ro employing the linear independence of the time functions $1, t, \hat{}2, t\hat{}3$:

$$, R(t) = Rp*P(t) + Re*E(t) + Rt*t + Ro$$

$$R0 = Rp*P0 + Re*E0 + Ro$$

$$R1 = Rp*P1 + Re*E1 + Rt$$

$$R2 = Rp*P2 + Re*E2$$

$$R3 = Rp*P3 + Re*E3 \quad (4)$$

The solution of this equation system of four equations to four unknowns leads to recovery of the control coefficients Rp, Re, Rt, Ro.

With another choice of non linear-dependent influencing variables as well, an equation system is also obtained of which the solution furnishes the desired control coefficients.

The process explained here relates to the complexity degree of the resistance variation (e.g. polynom of the 3rd degree) directly to the number of the influencing parameters (e.g. 3).

Logically, the resistance variation is approximated by a polynom of which the degree is not higher than the number of the influencing variables assumed to be linearly independent.

In this manner, the resistance variation is reduced to the components which can be explained as a reaction of influencing parameters derivable from electrical quantities.

BRIEF DESCRIPTION OF THE DRAWINGS

Additional features and advantages of the present invention will become more apparent from a description that follows with reference to appended drawings wherein.

DESCRIPTION OF THE PREFERRED EMBODIMENT

All these curves extend over a time t of four welding periods, i.e. with an alternating current of 50 hertz over 80 milliseconds. These are divided into four thousand measuring points.

Figure 1:
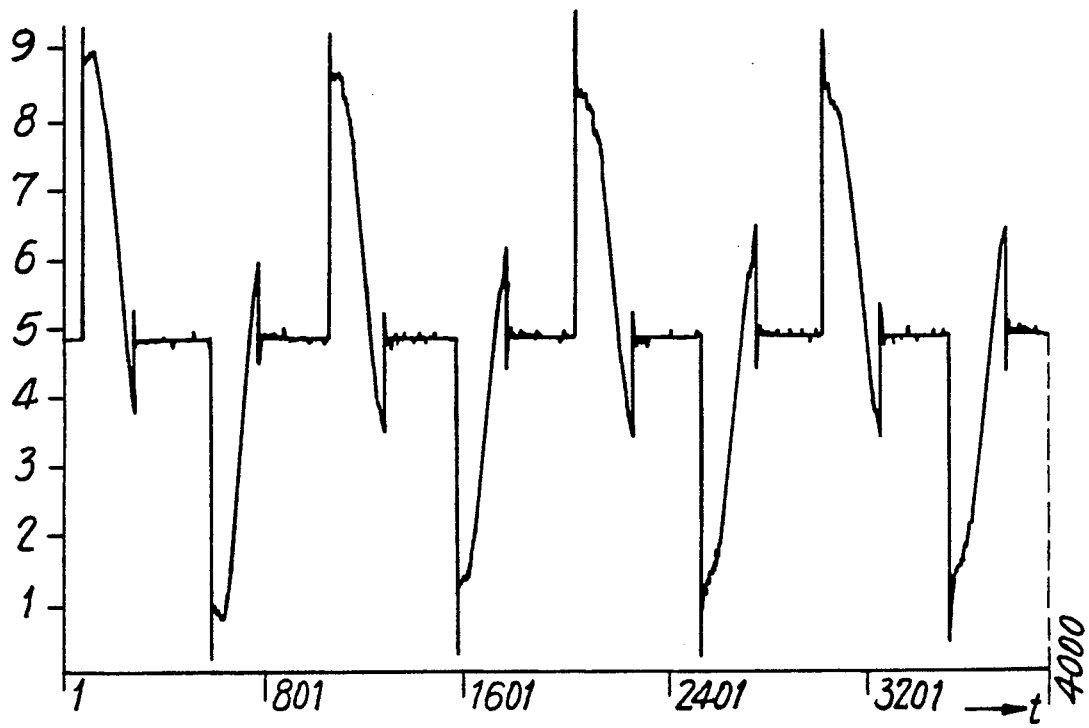
FIG. 1 shows data original U (t)
Figure 2:
FIG. 2 shows data original dI(t)

FIGS. 1 and 2 show in relative magnitudes the variation of the measured voltage U(t) and the measured current strength dI.

Figure 3:
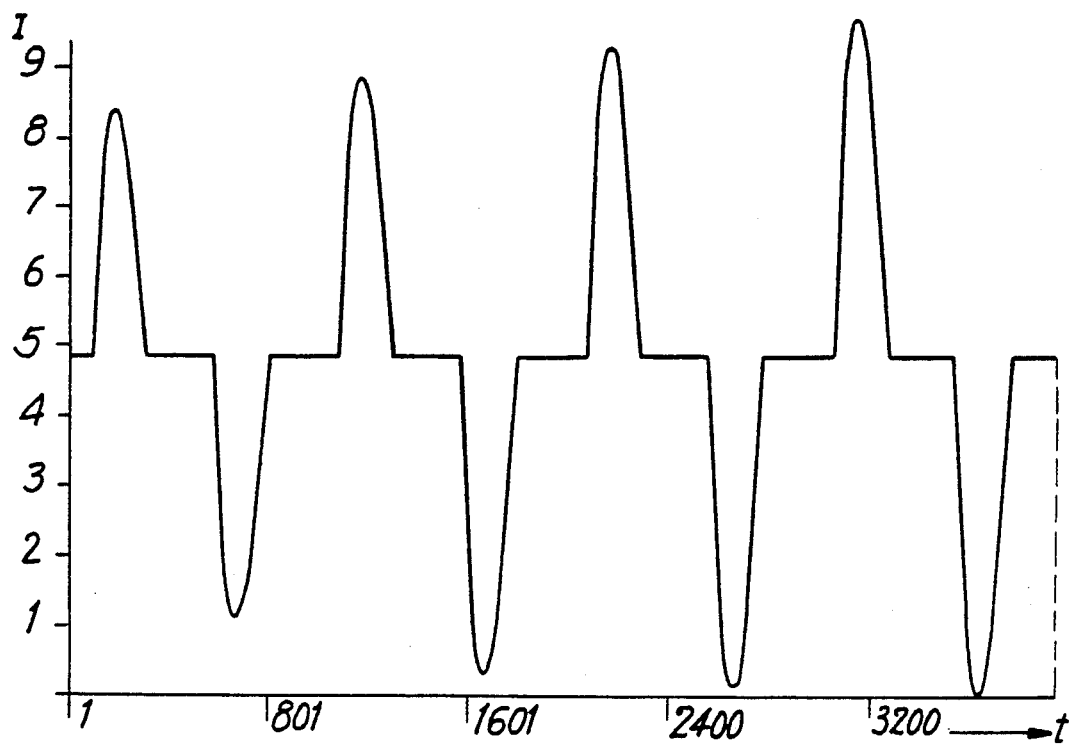
FIG. 3 shows data current I(t)

FIG. 3 shows the variation of the welding current I(t) = integral of dI according to FIG. 2.

Figure 4:
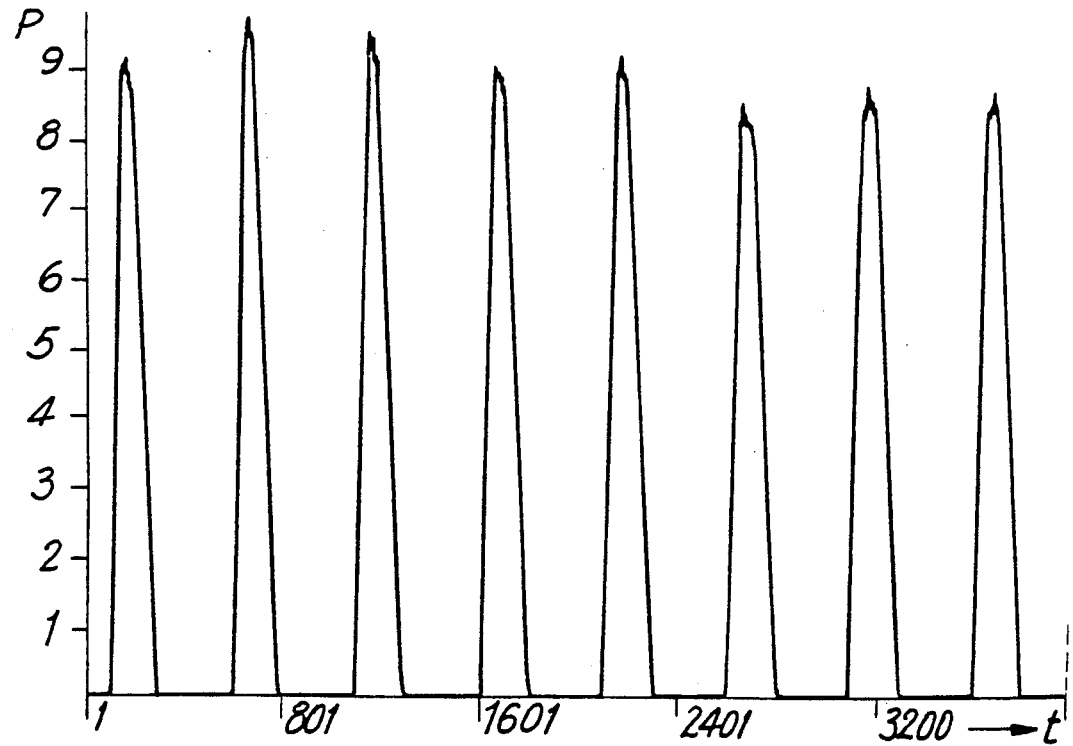
FIG. 4 shows data power P(t)

FIG. 4 shows the variation of the power P(t) which is determined from the measured values of the corrected electrode voltage U(t) and the values of the welding current I(t) according to FIG. 3 by forming the product U(t) * I(t).

Figure 5:
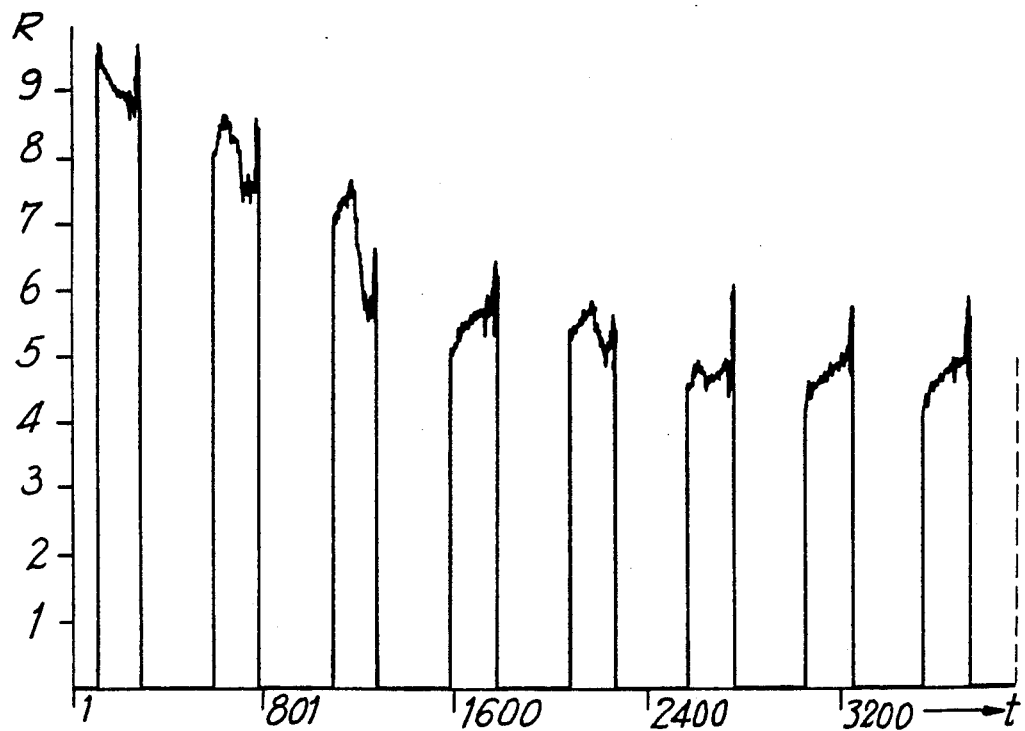
FIG. 5 shows data resistance R(t) and
FIG. 6 shows data resistance-fit R(t) for four welding periods or eight welding half periods.

FIG. 5 shows the variation of the resistance R(t) which is determined from the corrected measured values of the electrode voltage U(t) and the values of the welding current by forming the quotient U(t)/I(t). The gaps are due to the current pauses during the phase angle time of the primary voltage at the welding transformer.

Figure 6:
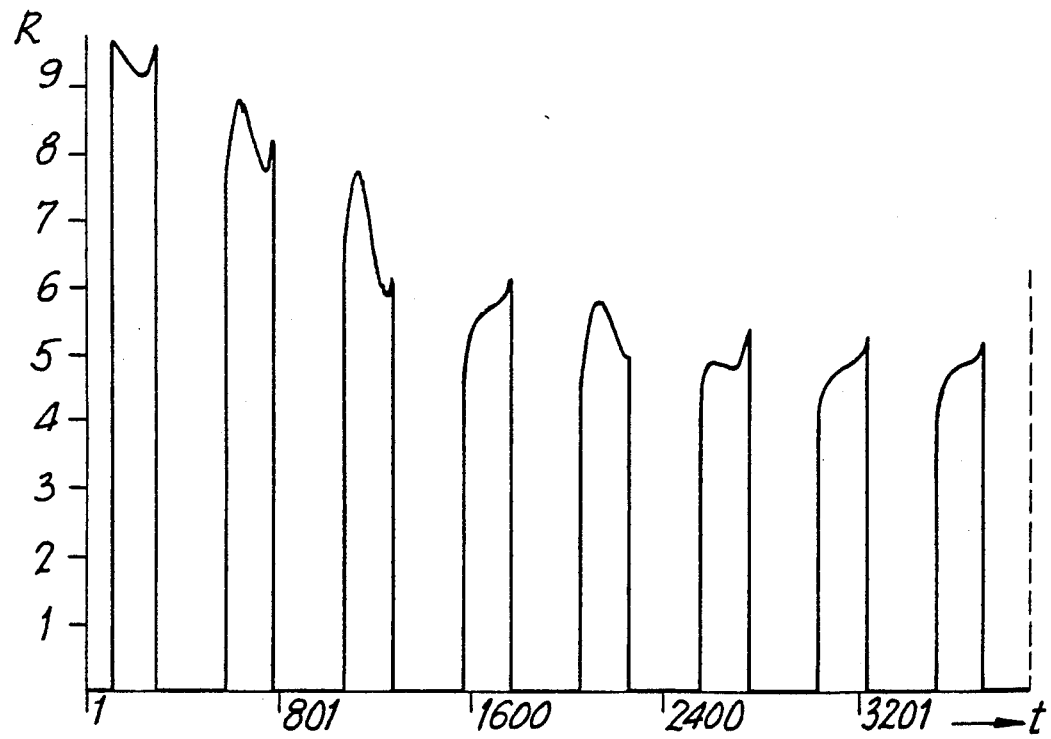

FIG. 6 shows the smoothed profile of the resistance R(t) calculated by equation (4) from the coefficients which were calculated by means of the least-square method from the resistance profile of FIG. 5.

"FIG. 7 shows a block diagram of a regulating device according to the invention" added by Amendment of May 1, 1990.

The mathematical processing of the measured data makes it possible to image the complex physical processes in welding in signal variations, e.g. sign changes, easily identifiable for the evaluating unit.

By using the control device according to the invention, spot welding joints can be made which are optimally adapted points for point to the external marginal conditions by regulating the electrical power. This makes it possible to reduce the number of weld spots per workpiece. Furthermore, edges or burrs causing injuries and optical impairments of the weld spots can be avoided. This control device can moreover furnish and document objective information on the quality of the spot weld joint, it works on-line and automatically and can easily be adapted to existing plant and equipment. The efficiency of the control device depends on the quality relevance and precision of the data sets derived from the measured values and the ability of the device to determine these data sets in real time to enable appropriate control interventions to be made.

The quantitative acquisition of the effect of the welding influencing variables on the dynamic resistance as correcting or command variables, the continuous acquiring of the measured data and the simultaneous elimination of the interfering factors permits a real-time regulation within a welding half period. Due to the great density of the information and the analyzable characteristics, when using the mathematical physical model described the error-compensated electrode voltage, simple to tap off, and the current strength of the welding current, detectable for example by means of Rogowski belts, suffice as measured data over the time.

In the arc welding process, department from the bandwidth ranges can indicate departure from the weld seam desired curve and effect a correction of the weld seam actual curve to the weld seam desired curve. The control device advantageously comprises a means made from electronic parts in digital technology, e.g. semiconductor memories, which indicates or prints out failure to observe the bandwidths of one or more of the quantitative effects of influencing variables on the dynamic resistance of the workpiece via a display, printer, signal lamp or the like.

We claim:

1. A method of regulating a welding operation comprising the steps of measuring current strength of a welding current at welding electrodes and measuring voltage at welding electrodes; determining a resistance index of a workpiece to be welded during the welding operation from values of the measured current strength of the welding current and the voltage; storing the resistance index; evaluating the resistance index by comprising it with an empirically determined correcting or command variable; determining quantitatively and with a resolution of at least 10,000 measuring points/sec from the measured values, the correlation of a welding influencing parameter selected from the group consisting of power, energy, charge amount, electrode voltage, current strength and their combinations, with the resistance index of the workpiece, said step of determining quantitatively the effect of the welding influencing parameter including detecting quantitatively the welding influencing parameter as a correcting or command variable; and employing the welding influencing parameter for controlling a welding energy.

2. A method according to claim 1 wherein said step of measuring current strength and voltage includes measuring of time variations of current strength and electrode voltage of each welding current half wave or period, storing the measured data, mathematically processing the measured data, and evaluating the measured data by comparsion with the correcting or command variable.

3. A method according to claim 2 wherein the step of determining the correlation of the influencing welding parameter includes determining the correlation of the welding influencing parameter of a welding half period and employing the so determined correlation for regulating one of the subsequent welding half periods.

4. A method according to claim 3 further comprising the step of predetermined a bandwidth region of the quantitative correlation of the welding influencing parameter with the resistance and maintaining the bandwidth region by regulation to thereby prevent splattering of a molten material resulting from departure from the bandwidth region due to inadequate power.

5. A method according to claim 4 comprising the step of compensating the interference induced in a sensor line for electrode voltage by the welding curent.

6. A method according to claim 5 wherein the compensating or correcting step comprises the step of automatically redetermining the magnitude of the necessary compensation or correction for each welding.

7. A method according to claim 2 wherein the step of determining the correlation of the influencing welding parameter includes determining the correlation of the welding influencing parameter of a welding half period and employing the so determined correlation for regulating said welding half period.

* * * * *